No. 874,383. PATENTED DEC. 24, 1907.
W. H. BISHOP.
SQUARE.
APPLICATION FILED MAY 18, 1907.
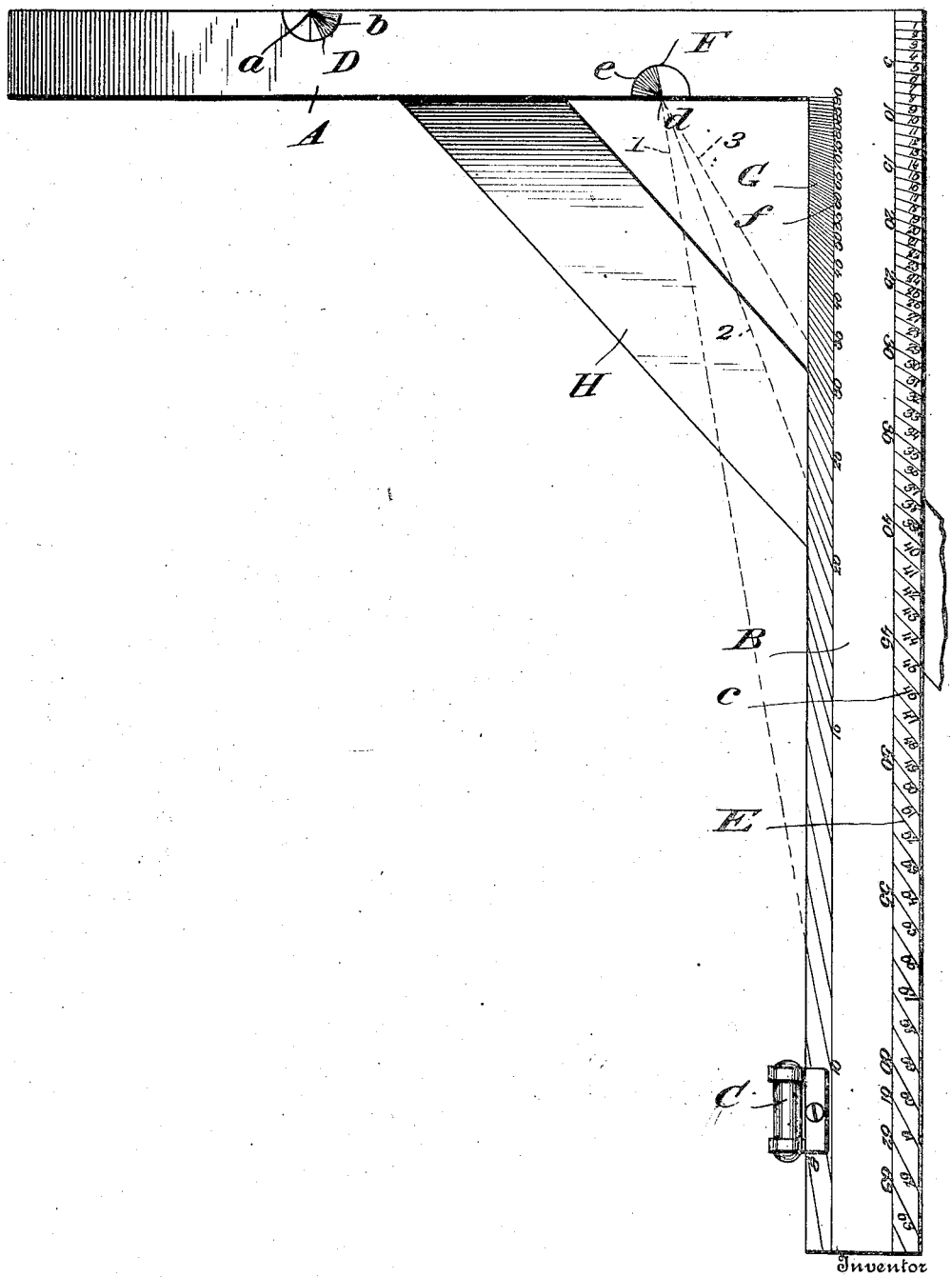

UNITED STATES PATENT OFFICE.

WADE H. BISHOP, OF BIRMINGHAM, ALABAMA.

SQUARE.

No. 874,383.  Specification of Letters Patent.  Patented Dec. 24, 1907.

Application filed May 18, 1907. Serial No. 374,367.

*To all whom it may concern:*

Be it known that I, WADE H. BISHOP, citizen of the United States, residing at Birmingham, in the county of Jefferson and State of Alabama, have invented new and useful Improvements in Squares, of which the following is a specification.

Our invention pertains to measuring instruments and more particularly to squares; and it consists in the peculiar and advantageous degree square hereinafter described, and particularly pointed out in the claim appended.

In the accompanying drawings, forming part of this specification: the figure is a view illustrative of the manner in which our novel degree square is used to advantage in laying out work.

The square is preferably though not necessarily made of steel, and comprises a tongue A, a blade B extending at a right angle to the tongue and which is preferably longer and wider than the tongue in about the proportion shown, and a spirit level C which is arranged at the inner edge of the blade B adjacent to the outer end thereof and extends in the direction of the length of the blade and is preferably connected thereto in a detachable manner, this latter in order that when desired the level may be removed to permit of the square being used without the same.

On one side of the tongue A and at an intermediate point in the length of the outer edge thereof is provided a positioning point $a$, and from the said point $a$ radiate the lines $b$ of a segmental scale D, the purpose of which will be hereinafter pointed out in detail. On the same side of the blade B and adjacent to the outer edge thereof is provided an angle scale E some of the lines $c$ of which are numbered as shown to indicate the degrees of the angles relative to the point $a$. From this it follows that the angle scale E is designed to be used in combination with the segmental scale D, and the manner of such use will be presently set forth in detail.

At one side and on the inner edge of the tongue A and about three inches from the inner corner of the square is provided a positioning point $d$ from which radiate the lines $e$ of a segmental scale F, and on the same side of the blade B and adjacent to the inner edge thereof is provided an angle scale G some of the lines $f$ of which are numbered to indicate the degrees of the angles relative to the point $d$.

The lines of the several scales are preferably cut in the steel of which the square is formed, and by virtue of the scales F and G being arranged at one edge of the square and the scales D and E at the other edge thereof, it will be apparent that the liability of confusion in the use of the scales is reduced to a minimum.

In using our novel square in laying out work, the positioning point $a$ of the segmental scale D is placed at the edge of a timber, indicated by H, and the square is moved until the line $c$ of the desired degree on blade B is alined with the same edge of the timber H, when the timber is marked by a pencil or the like drawn against the edge of blade B. In the arrangement shown it will be seen that the timber H intersects both tongue A and blade B at 45 degrees.

When it is desired to bisect an angle of any given degree, the user of the square takes half of the said number of degrees of the scale E on blade B. For instance if it is necessary to cut the miter for any uniformal "gon", the user divides 180 by the number of sides in the "gon", and if an octogon divide by 8 and the result is 22½. This degree line of the scale E is placed at the edge of the timber and the timber is marked by the blade on the proper miter or bisect.

By reference to the drawing, it will be seen that several dotted lines are arranged in proper position, relative to the square, to represent objects which are on different degrees or angles of inclination. The tongue A is arranged vertically, the level C assisting in the accurate positioning of the tongue, and all of the lines diverge from the positioning point $d$ and rest in alinement with particular lines $e$ of the segmental scale F. The line numbered 1 is on an incline of ten degrees to the blade B, the line numbered 2 on an incline of twenty degrees, and the line numbered 3 on an incline of thirty degrees, and so on. From this it will be understood that the segmental scale F, scale G and level C are adapted to be used for determining the angle of inclination of any incline or for placing any object at any desired angle of inclination.

It will be appreciated from the foregoing that our improvements greatly enlarge the range of usefulness of a square and yet do not materially increase the cost of the same.

Having described our invention, what we claim and desire to secure by Letters-Patent, is:

The herein described square comprising a tongue, a blade, and a spirit level carried by and extending in the direction of the length of the blade and constituting a permanent part of the square; the said square having positioning points on the tongue at opposite edges and at different distances from the outer end thereof and also having on the blade, at opposite edges thereof, angle scales comprising lines disposed for use in combination with the respective positioning points and numbered in regular sequence to indicate the degrees of the angles.

In testimony whereof I have hereunto set my hand in presence of two subscribing witnesses.

WADE H. BISHOP.

Witnesses:
A. R. WILKERSON,
HILL FERGUSON.